Strayer & Hazelhurst.
Bolt and Screw Cutter.
Nº 66,107. Patented Jun. 25, 1867.
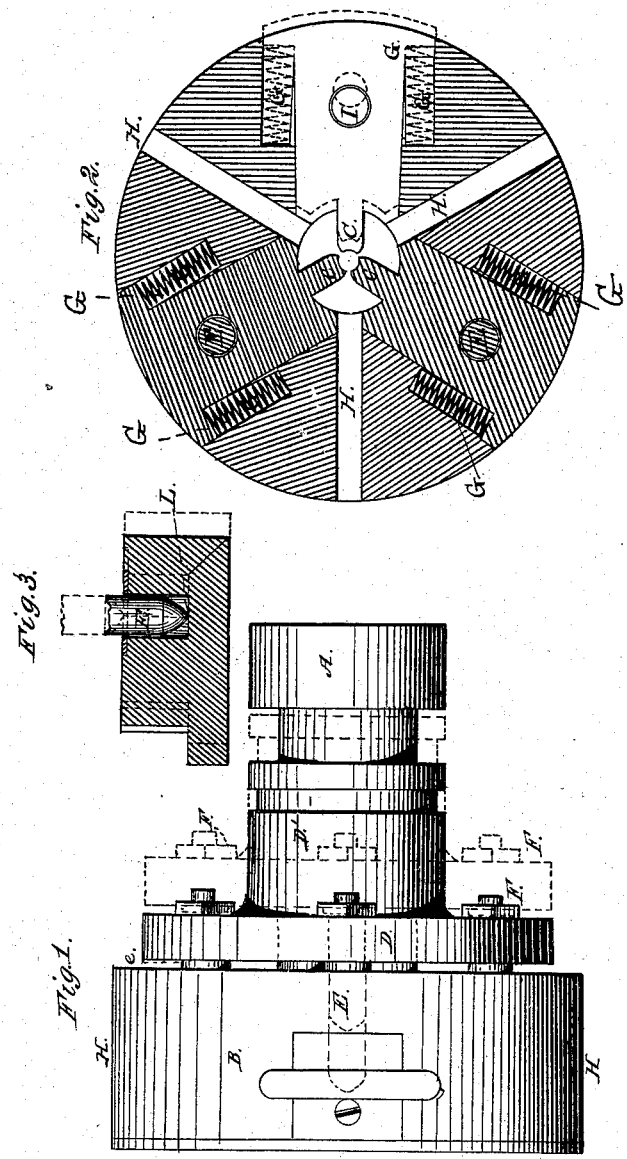
Inventor.
Strayer & Hazelhurst
Daniel Breed Atty

United States Patent Office.

JACOB STRAYER AND THOMAS HAZELHURST, OF SOUTH BEND, INDIANA.

Letters Patent No. 66,107, dated June 25, 1867.

IMPROVED BOLT-CUTTER.

*The Schedule referred to in these Letters Patent and making part of the same.*

TO ALL WHOM IT MAY CONCERN:

Be it known that we, JACOB STRAYER and THOMAS HAZELHURST, of South Bend, in the county of St. Joseph, and State of Indiana, have invented a new and useful Improvement in Bolt or Screw-Cutters; and we do hereby declare that the following is a full and exact description thereof, reference being had to the accompanying drawings, and to the letters of reference marked thereon.

Our invention consists in a peculiar arrangement and construction of bolts with bevelled ends, or ends turned to a point, and the use of this bevel for pushing forward the dies or cutters in a chuck for cutting screw-threads and bolts. In the accompanying drawings—

Figure 1 is a side view of our screw-cutter or bolt-cutter.

Figure 2 is a transverse section showing the dies or cutters and the springs for operating the same, the front portion of the face plate of the chuck being cut away.

In the construction of our improved screw or bolt-cutter a shaft, A, fig. 1, is provided with a chuck or face plate, B, in which are arranged three or more dies or cutters C, with suitable edges for cutting screw-threads.

For the purpose of adjusting these dies or cutters we employ an adjusting plate, D, having a neck, D', and sliding upon the shaft A. This plate D carries three or more short bolts E, very firmly fixed in the plate D by means of shoulders $e$ and nuts F near one end of the bolts. These bolts are nicely fitted to holes I in cutters C. The points of the bolts are bevelled, as seen at L, fig. 3, so as to act like wedges upon the cutters when such points are entering the hole I, the cutters being pushed back by the springs so that only the point of the bolt can enter such hole until the cutter is pushed forward.

The operation is as follows: When the adjusting plate D is pushed back, or to the right, and the dies or cutters are also pushed out by the springs G, the bevel of the points of the bolts rests against one side of the holes in the cutters. Now, as the plate D and the bolts E are pushed forward, or to the left, the point or bevel on the points of the bolts pushes all three of the cutters or dies forward toward the centre of the chuck. Thus the cutting of the screw-thread may be regulated at pleasure. The chuck may have spring H, and in other respects be constructed and operated in the usual manner.

Having thus fully described our invention, what we claim, and desire to secure by Letters Patent of the United States, is—

1. The bolts E, in combination with the cutters C and springs G, arranged and operated substantially as above described.

2. We also claim the combination of the springs G, cutters C, chuck B, and bolts E, substantially in the manner and for the purposes set forth.

JACOB STRAYER,
THOMAS HAZELHURST.

Witnesses:
D. GREENAWALT,
JOHN SHEDDRICK.